United States Patent
Krebs

(10) Patent No.: US 11,316,877 B2
(45) Date of Patent: Apr. 26, 2022

(54) INTRUSION DETECTION SYSTEM ENRICHMENT BASED ON SYSTEM LIFECYCLE

(71) Applicant: SAP SE, Walldorf (DE)

(72) Inventor: Rouven Krebs, Ettlingen (DE)

(73) Assignee: SAP SE, Walldorf (DE)

( * ) Notice: Subject to any disclaimer, the term of this patent is extended or adjusted under 35 U.S.C. 154(b) by 615 days.

(21) Appl. No.: 15/665,758

(22) Filed: Aug. 1, 2017

(65) Prior Publication Data
US 2019/0042737 A1 Feb. 7, 2019

(51) Int. Cl.
| | | |
|---|---|---|
| *H04L 29/06* | (2006.01) |
| *G06F 21/55* | (2013.01) |
| *H04L 43/16* | (2022.01) |
| *H04L 43/062* | (2022.01) |
| *G06F 21/56* | (2013.01) |

(52) U.S. Cl.
CPC ........ *H04L 63/1425* (2013.01); *G06F 21/552* (2013.01); *H04L 43/062* (2013.01); *H04L 43/16* (2013.01); *H04L 63/1416* (2013.01); *H04L 63/1441* (2013.01); *H04L 63/1491* (2013.01); *G06F 21/56* (2013.01); *H04L 63/0263* (2013.01)

(58) Field of Classification Search
CPC . H04L 63/14; H04L 63/1408; H04L 63/1416; H04L 63/1425; H04L 63/1433; H04L 63/1441; G06F 21/55; G06F 21/552; G06F 21/554; G06F 21/577
See application file for complete search history.

(56) References Cited

U.S. PATENT DOCUMENTS

| | | |
|---|---|---|
| 6,775,657 B1 | 8/2004 | Baker |
| 6,827,578 B2 | 12/2004 | Krebs et al. |
| 6,839,850 B1 | 1/2005 | Campbell et al. |
| 7,181,768 B1 | 2/2007 | Ghosh et al. |
| 7,313,618 B2 | 12/2007 | Braemer et al. |
| 7,844,829 B2 | 11/2010 | Meenakshisundaram |

(Continued)

OTHER PUBLICATIONS

Final Office Action issued in U.S. Appl. No. 15/665,700 dated May 23, 2019, 27 pages.

(Continued)

*Primary Examiner* — Zachary A. Davis
(74) *Attorney, Agent, or Firm* — Fish & Richardson P.C.

(57) ABSTRACT

Techniques are described for automatically incorporating lifecycle information for a secured environment (SE) into an intrusion detection system monitoring the secured environment's operations. In one example, a secured environment including at least one component is monitored, where the secured environment is associated with a lifecycle operations manager (LOM) responsible for managing lifecycle operations associated with at least one component in the SE. One or more log files associated with operations of each of the at least one components are obtained, along with log files associated with lifecycle operations executed by the LOM. A determination is made as to whether the particular activities documented in the log files indicate a violation of at least one malicious action rule. In response to determining that the log files are associated with a malicious action rule, a mitigation action associated with the violation is triggered.

18 Claims, 5 Drawing Sheets

(56) References Cited

U.S. PATENT DOCUMENTS

| | | | |
|---|---|---|---|
| 8,254,882 B2* | 8/2012 | Cam-Winget | H04W 12/08 |
| | | | 455/410 |
| 8,543,694 B2* | 9/2013 | Petersen | G06N 5/025 |
| | | | 709/224 |
| 8,644,755 B2 | 2/2014 | Krebs et al. | |
| 8,966,643 B2* | 2/2015 | Chen | G06Q 10/10 |
| | | | 726/26 |
| 9,215,244 B2* | 12/2015 | Ayyagari | H04B 7/18593 |
| 9,401,924 B2* | 7/2016 | Ge | H04L 63/1425 |
| 9,424,063 B2* | 8/2016 | Kirubanandam | G06F 11/0709 |
| 9,641,544 B1* | 5/2017 | Treat | H04L 63/02 |
| 9,686,309 B2* | 6/2017 | Wang | H04L 63/1425 |
| 10,075,462 B2* | 9/2018 | Mehta | H04L 63/1425 |
| 10,320,813 B1* | 6/2019 | Ahmed | H04L 63/1416 |
| 10,620,598 B2* | 4/2020 | Halabieh | G06Q 50/04 |
| 2003/0151629 A1 | 8/2003 | Krebs et al. | |
| 2003/0152899 A1 | 8/2003 | Krebs et al. | |
| 2003/0152900 A1 | 8/2003 | Krebs et al. | |
| 2003/0154176 A1 | 8/2003 | Krebs et al. | |
| 2003/0188189 A1 | 10/2003 | Desai et al. | |
| 2004/0117658 A1 | 6/2004 | Klaes | |
| 2007/0073519 A1 | 3/2007 | Long | |
| 2008/0120499 A1 | 5/2008 | Zimmer et al. | |
| 2010/0212013 A1 | 8/2010 | Kim et al. | |
| 2012/0090028 A1* | 4/2012 | Lapsley | H04L 63/1416 |
| | | | 726/22 |
| 2013/0263256 A1 | 10/2013 | Dickinson et al. | |
| 2014/0137257 A1 | 5/2014 | Martinez | |
| 2014/0283113 A1 | 9/2014 | Hanna | |
| 2015/0033322 A1 | 1/2015 | Wang et al. | |
| 2015/0237067 A1 | 8/2015 | Talyansky | |
| 2015/0302198 A1 | 10/2015 | Payne et al. | |
| 2015/0350229 A1 | 12/2015 | Mitchell | |
| 2016/0099951 A1* | 4/2016 | Kashyap | H04L 63/145 |
| | | | 726/23 |
| 2017/0118241 A1 | 4/2017 | Call et al. | |
| 2017/0169217 A1 | 6/2017 | Rahaman et al. | |
| 2017/0178025 A1* | 6/2017 | Thomas | G06N 5/025 |
| 2018/0274927 A1 | 9/2018 | Epperlein et al. | |
| 2019/0042736 A1 | 2/2019 | Krebs | |

OTHER PUBLICATIONS

Kholidy et al., "A cost-aware model for risk mitigation in Cloud computing systems," 2015 IEEE/ACS 12th International Conferenceof Computer Systems and Applications (AICCSA) 2015, 7 pages.

Non-Final office action issued in U.S. Appl. No. 15/665,700 dated Nov. 18, 2019, 22 pages.

Sharma, "Multi-agent based intrusion prevention and mitigation architecture for software defined networks," 2017 International Conference on Information and Communication Technology Convergence (ICTC) Conference Paper I Publisher: IEEE, Oct. 18, 2017, 7 pages.

* cited by examiner

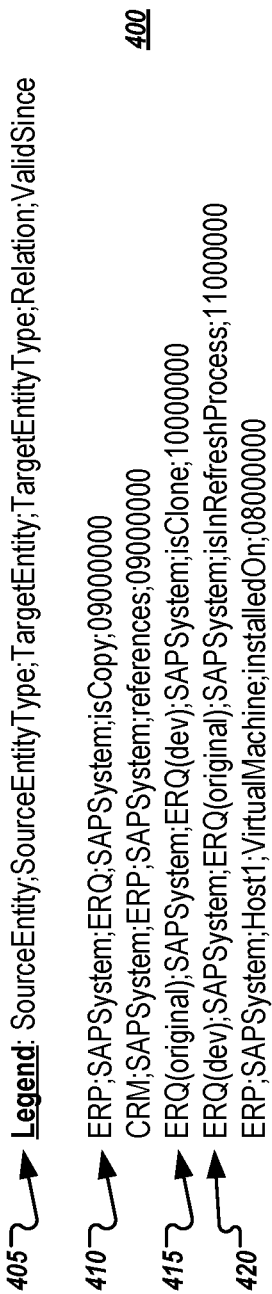
FIG. 4 – Example Lifecycle-Based Context

*500*

505 → SourceEntity;TargetEntity;Activity;StartTime;EndTime;User;Reason

510 → ERP;ERQ;systemCopy;08500000;09000000;UserA;"Test System needed for project X"
CRM;ERP;rfcConnectionConfiguration;08800000;09000000;UserA;"CRM integration with ERP"
ERQ(orginal);ERQ(dev);cloneSystem;09900000;10000000;UserB;"clone for development"
ERQ(dev);ERQ(orginal);refresh;10900000;11100000;UserB;"ticket: 15485AF545"

515 → ERP;USR;copy;12000000;12100000;Guest;""

FIG. 5 – Example LOM Log

--> This log rather expresses the activities with related users etc. The last log
entry shows something that might raise an alert. Because of the following reasons:
1. System Name USR: USR is a reserved SAP system name, nobody is allowed to use
2. System Name USR: since this will create a directory on the file system, it
could be used as an attack (linux systems have /usr directories...)
3. A Guest user should not be allowed to trigger a copy
4. There is no reason added for the activity.

INTRUSION DETECTION SYSTEM ENRICHMENT BASED ON SYSTEM LIFECYCLE

CROSS-REFERENCE TO RELATED APPLICATION

This application is a co-pending application of U.S. application Ser. No. 15/665,700, filed on Aug. 1, 2017 entitled "INTRUSION DETECTION SYSTEM ENRICHMENT BASED ON SYSTEM LIFECYCLE"; the entire contents of which are incorporated herein by reference.

TECHNICAL FIELD

The present disclosure relates to techniques for automatically incorporating lifecycle context information for a secured environment into an intrusion and/or threat detection system's monitoring operations.

BACKGROUND

Since the first computer resources have been shared, information technology (IT) security is a topic of continually increasing importance. With emerging data networks several decades ago to the recent emergence of cloud computing, IT security has become a major differentiator for software vendors and security providers. New legal restrictions in various jurisdictions make software vendors more responsible for initially securing their software and cloud-based offerings.

Combined with the increased value of and requirement for IT security, security experts remain relatively rare and the sheer volume of log files needing to be analyzed for complex systems make it impossible for a human expert to analyze which actions or operations occurring in a monitored system may indicate a threat.

SUMMARY

Implementations of the present disclosure are generally directed to automatically incorporating lifecycle context information for a secured environment into an intrusion and/or threat detection system's monitoring operations. In one example implementation, a computerized method executed by hardware processors can be performed. The example method can comprise monitoring, by an intrusion detection system, a secured environment comprising at least one component, where the secured environment is associated with a lifecycle operations manager responsible for managing lifecycle operations associated with at least one component in the secured environment. One or more log files associated with the operations of each of the at least one components can be obtained, as well as log files associated with lifecycle operations executed by the lifecycle operations manager. In some instances, only the log files associated with the lifecycle operations are obtained. At the intrusion detection system, a determination is made as to whether the particular activities documented in the log files associated with the operations of the at least one component in the secured environment and the log files associated with the lifecycle operations executed by the lifecycle operations manager indicate a violation of at least one particular malicious action rule from a malicious action rule set. In response to determining that the log files associated with the operations of the at least one component in the secured environment and the log files associated with the lifecycle operations executed by the lifecycle operations manager are associated with a malicious action rule, a mitigation action associated with the violation of the at least one particular malicious action rule is triggered.

Implementations can optionally include one or more of the following features. In some instances, the intrusion detection system comprises a threat detection system.

In some instances, obtaining the log files associated with the lifecycle operations executed by the lifecycle operations manager can comprise receiving, at the intrusion detection system, a forwarded copy of activity logs generated by the operations of the lifecycle operations manager.

In some instances, the lifecycle operation manager executes remotely from the secured environment.

In some instances, the method further comprises, prior to triggering the mitigation action associated with the violation of the at least one particular malicious action rule, several additional actions. A lifecycle-based context associated with the lifecycle operations manager can be accessed, wherein the lifecycle-based context stores contextual information associated with at least one lifecycle operation executed by the lifecycle operations manager. At the intrusion detection system, a determination is made as to whether the violation of the at least one particular malicious action rule is associated with one or more of the at least one lifecycle operations stored in the lifecycle-based context. In response to determining that the violation of the at least one particular malicious action rule is associated with one or more of the at least one lifecycle operations stored in the lifecycle-based context, the intrusion detection system can suppress triggering of the mitigation action.

In some instances, the mitigation action can include at least one of presenting a warning to a responsible entity and automatic triggering of at least one electronic countermeasure corresponding to the violation of the at least one particular malicious action rule.

In some instances, the malicious action rule set is evaluated by the intrusion detection system, wherein each malicious action rule defines at least one pattern defining a potential malicious action associated with one or more monitored activities occurring in association with the secured environment.

In some instances, the secured environment can include at least one of one or more independent application instances, systems comprising several related application instances, and an infrastructure environment, the infrastructure environment comprising at least one of one or more storage instances, one or more networks, one or more honeypots, and one or more firewalls.

Similar operations and processes may be performed in a system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the descrip-

DESCRIPTION OF DRAWINGS

FIG. 4 provides an example view of a lifecycle-based context generated by a lifecycle operation manager.

FIG. 5 provides an example view of a lifecycle log generated by a lifecycle operation manager.

DETAILED DESCRIPTION

Figure 1:
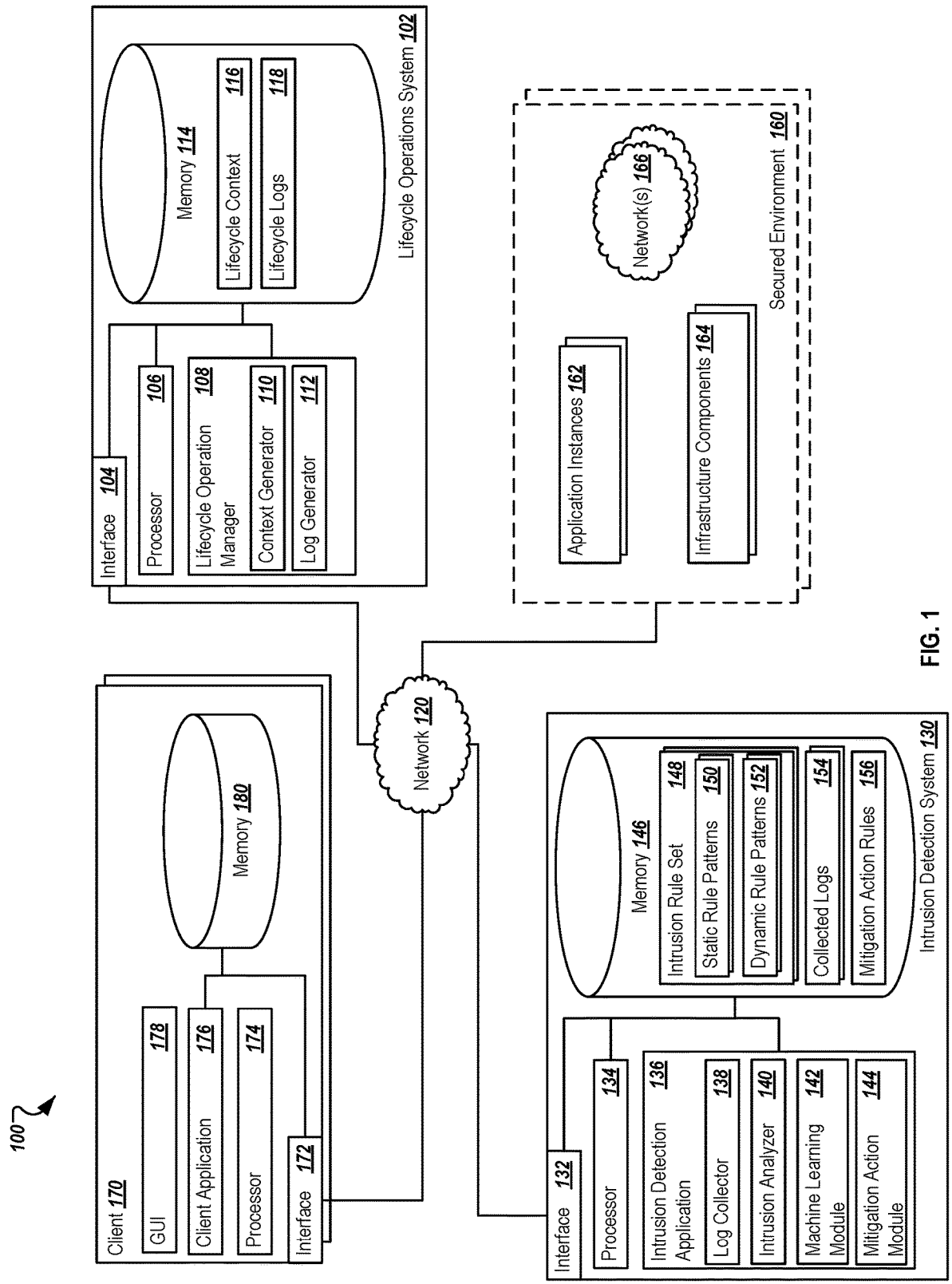
FIG. 1 is a block diagram illustrating an example system for automatically incorporating lifecycle information for a secured environment into an intrusion and/or threat detection system's monitoring operations.

The present disclosure relates to techniques for automatically incorporating lifecycle context information for a secured environment into an intrusion and/or threat detection system's monitoring operations.

IT security can be achieved by different approaches. A first approach focuses on the mitigation of potential attack vectors (e.g., by hardening the applications). A second approach focuses on the early recognition of malicious activities within a secured environment (SE), or malicious activities trying to harm any of the assets of these SEs from the outside. The latter approach is known as intrusion detection, and may be performed by an Intrusion Detection System (IDS) or a Threat Detection System (TDS), where an IDS may be a TDS or a TDS may be an IDS. For purposes of this disclosure, IDS and TDS are used interchangeably, although in some implementations one or both of the IDS or TDS may have additional or different functionality as compared to the other. The secured environment may comprise any combination of applications, application instances, infrastructure environments or portions thereof (e.g., storage, network(s), honeypots, firewalls, etc.), as well as any other suitable single component or multiple component systems or portions of systems that are monitored by a particular IDS/TDS for potential intrusions and threats.

In many instances, IDS and TDS leverage pattern recognition-based approaches to analyze log file information associated with the secured environment as a whole as well as to particular components within the secured environment. Information associated with different components within the secured environment can be combined and correlated in some instances. Contextual information about the secured environment may also be leveraged in the analysis, such as whether a particular secured environment is publically visible. If the secured environment is publically visible, a large amount of automatically generated malicious traffic may be expected. In the case of a private deployment within an entity's internal network, however, such traffic may be very unusual. Thus, different pattern recognition types and thresholds may be applied. In response to the collected log file entries matching one or more patterns corresponding to potential malicious behavior, a warning can be automatically presented to a suitable system or user, or one or more automatic countermeasures can be triggered. By matching the patterns of the log files to the known potential threats, the relevant information associated with the identified threats can be preselected and interpreted by the TDS/IDS and reduce the workload for IT security experts in initially identifying potential problems.

In current IDS and TDS systems, a number of shortcomings are identified. First, IDS/TDS systems lack in contextual knowledge of the history of the components in the secured environment. For example, the IDS/TDS system may not consider the timestamp of when a new application instance was created within the secured environment. Further, the IDS/TDS system lack in contextual knowledge of the lifecycle operations executed on individual components within the secured environment. For example, the timestamp of when a system has been renamed or refreshed may not be considered in the particular activities occurring in association with the component. Third, the IDS/TDS systems may lack in contextual knowledge of the dependencies of the components within the secured environment and why particular lifecycle operations associated with a first component may affect a second component (e.g., when or why a system has been copied from an existing one). IDS/TDS systems may lack in contextual knowledge of the relations of components in different abstraction layers. For example, Application Instance A in a particular secured environment may be installed on Virtual Host B. Virtual Host B may be running on Virtualization Manager/Hypervisor C. Virtual Host B has a mounted storage volume from storage D, while the image of Virtual Host B may be located on storage E. When lifecycle operations with one of these parts occurs, particular actions on one or more of the other parts may occur as well, which may be unknown or unrecognized by the IDS/TDS system. Further, IDS/TDS systems lack in contextual knowledge of lifecycle operation-relevant meta-information. For example, different application instances and other components within the secured environment may disjunctively belong to organizational groups (i.e., pools) for easier administration and rights management of lifecycle operations such that some operations may be triggered at or close to the same time.

Without such contextual lifecycle knowledge, some activities performed within the secured environment may be secure and proper, but based on the timing and/or type of action, may be identified as a potentially malicious action or threat to the secured environment. The risk of false positive and/or false negative alerts within the pattern recognition mechanism are therefore high, causing the IDS/TDS systems to not work as precisely as would be possible if such information was known. Through leveraging of the present solution, the costs of manual analysis by security experts can be reduced by increasing the accuracy of the automated intrusion and thread detection systems, thereby reducing incorrect indications of potential issues (or incorrect indications of no potential issues).

The present solution is solved by generating and making a lifecycle-based context (LBC) available to the IDS/TDS systems for consultation during and/or after their malicious action rule evaluation. The LBC can store relevant information about lifecycle-relevant activities, actions, and status that can be leveraged with the analysis of the log information associated with the components of the secured environment, and can be located in a place accessible to the IDS/TDS, or provided automatically to the IDS/TDS, where appropriate. In some instances, the LBC can be updated automatically by a dedicated computer system, such as a lifecycle operations manager ("LOM") that executes the lifecycle operations for one or more of the components within the secured environment. In some instances, static information for the LBC may be updated manually by a human user (e.g., identifying particular high-level information about the lifecycle operations of the system). The LBC is then read by the IDS/TDS in association with their operations to determine whether one or more of the potentially malicious operations or activities identified within the secured environment are related or tied to one or more legitimate lifecycle operations. In other words, the present solution combines the LOM and its operations via the LBC with the intrusion and threat detection operations of the IDS/TDS, allowing for additional intelligence and context to be provided to the analysis derived from the log files of the components within the secured environment.

Several examples of patterns leveraging the LBC are included here. Additional examples and instances will be understood by persons of skill in the art. In a first example, a timestamp is associated with a new application instance when that application instance is created. The timestamp of that creation may only be available from the LBC. When new components are added to the secured environment, a surge or increase in the network traffic may initially trigger a determination of a potentially malicious activity. However, based on the knowledge obtained from the LBC, the increased traffic in response to the creation of the new instance is considered prior to a mitigation action being launched by the IDS/TDS, as the threat detections systems are aware of reasons for the change and can suppress the triggering of the initially identified mitigation action. In some instances, the IDS/TDS may lower the level of a corresponding mitigation action, perhaps moving down from triggering an initially-determined automatic countermeasure to providing a warning or notification message to a system administrator or other security professional.

In other examples, lifecycle operations on individual artifacts may be used to identify or update the malicious activity analysis. A timestamp in the LBC indicating that a system has been renamed can be used to connect log files with different component names, and can identify ongoing attack patterns that occur after or are spread across the system's rename, thereby avoiding false negatives.

A timestamp at which a system has been refreshed (e.g., where data of a copied system is updated by the data corresponding to the original or source system) can be used to explain a sudden increase of network traffic between two systems where usually no traffic would occur. The LBC can provide the context information to allow the IDS/TDS system to understand the reason for the identified issue, particularly when the two systems are located in different pools or are on different lifecycle operation schedules. By accessing and incorporating the LBC into the determination, the false positives that would have otherwise been triggered can be suppressed or otherwise modified as appropriate. Similarly to the refresh instance, a timestamp of when a particular component is copied from an existing one can explain a sudden increase in network traffic. Further, the timestamp from the LBC related to the copy action can later be used to validate whether a later refresh between the two components was valid.

Another example where the LBC-based information can be of assistance is for components on different abstraction layers, such as where a port scan on a host level can be correlated to numerous failed logins on the HTTP server's hosted application. By connecting these components, a warning of an attempted intrusion can be triggered related to the particular host or hosted application based on this connection.

Further, knowledge of lifecycle operation-relevant meta-information might be used to identify malicious network traffic/information leakage in case an intense dataflow between two pools can be observed. Such a data flow may be relevant, particularly where the administrative lifecycle operations of these pools are disjoint, thereby avoiding false negatives indicating no potential issue.

Any number of other instances of information available within the LBC can be used to modify, inform, or otherwise strengthen the precision of the IDS/TDS's analysis, and is considered herein. By combining contextual information regarding lifecycle operations of computer systems, applications, and infrastructure associated with the components of the secured environment in combination with the existing IDS/TDS pattern recognition, the described system provides a significant increase in the automatic analysis performed by the existing systems, providing for an enhanced detection and identification process.

In a second solution, a related but different approach can be taken to further incorporate the LOM into the threat and intrusion detection process. For example, while the first solution considers the lifecycle operations in light of determined potential malicious activity performed within the secured environment, consideration of potential threats associated with the LOM itself may not be identified. In other words, the IDS/TDS leverages information received from the components of the secured environment, which includes network traffic, access logs, and activities performed by the components. However, those systems do not actively analyze the operations that are executed at the systems themselves. Thus, an attacker who is able to control a central management software could trigger malicious activities. Often, an attacker has to control the central management software together with additional infrastructure component (s) to perform significantly malicious actions, such as accessing confidential data. Due to the lack of lifecycle operation logs, the risk of false negatives may be high, including those where particular actions performed at components in the secured environment are associated with approved lifecycle operations when the LOM is under malicious control.

Thus, the second proposed solution causes the LOM to make available and/or provide the activity logs of the LOM to the IDS/TDS for incorporation into the threat and intrusion analysis. Thus, the actively triggered lifecycle operations can be analyzed for malicious activities, particularly when linked to the cause they have on one or more of the components within the secured environment.

The TDS/IDS rule sets can be updated as necessary to consider the log files of the LOM system (e.g., identifying particular patterns that may indicate attacker access to the LOM). Three examples of such malicious signaling activity are included, but are not meant to be limiting. In a first example, a system may be copied several times within a short period of time. Such actions as triggered at the LOM may indicate an unusual pattern, and may indicate that an attacker is trying to copy data from a productive system to any host at which the attacker may have control. A second example may be a large amount of created systems in a particular secured environment identified at the LOM, where those created systems may indicate a denial-of-service (DoS) attack where an attacker tries to allocate all free resources to take down services provided by those systems.

In a third instance, a system rename to an already existing system name may indicate a spoofing attack is being placed.

This solution allows the IDS/TDS's pattern recognition capabilities to be applied to the lifecycle operations performed by the LOM system, thereby considering whether the lifecycle operations performed in association with one or more of the components in the secured environment can be analyzed for potentially harmful attacks in addition to the actual operations performed at the components. Existing solutions focus on the component's actions and/or information about the domain. This solution analyzed those performed lifecycle operations triggered by the LOM to determine whether such actions are out of place or time with expected and/or safe actions. Further, the first solution (i.e., using the LBC and its contextual information) and the second solution can be combined to provide two additional layers into the threat detection mechanics, further strengthening existing IDS/TDS solution.

Turning to the illustrated implementation, FIG. 1 is a block diagram illustrating an example system 100 for automatically incorporating lifecycle context information for a secured environment into an intrusion and/or threat detection system's monitoring operations. System 100 is a single example of a possible implementation, with alternatives, additions, and modifications possible for performing some or all of the described operations and functionality. As illustrated in FIG. 1, system 100 is associated with systems capable of sharing and communicating information across devices and systems (e.g., lifecycle operations system 102, intrusion detection system 130, secured environment 160, and client 170, among others, via network 120). Although components are shown individually, in some implementations, the functionality of two or more components, systems, or servers may be provided by a single component, system, or server. Further, additional components may be included in alternative implementations that perform at least a part of the functions of the illustrated components. For example, at least a portion of the components illustrated in intrusion detection system 130 may be stored remotely from the system 130, or at another location that is accessible via network 120.

As used in the present disclosure, the term "computer" is intended to encompass any suitable processing device. For example, client 170, lifecycle operations system 102, and intrusion detection system 130 may be any computer or processing device such as, for example, a blade server, general-purpose personal computer (PC), MAC®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general purpose computers, as well as computers without conventional operating systems. Client 170 may be any system which can request data, execute an application, and/or interact with the intrusion detection system 130 and/or the lifecycle operations system 102. The client 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, WINDOWS, MAC OS®, JAVA™, ANDROID™, WINDOWS PHONE OS, iOS™, and any other real-time OS.

Lifecycle operations system 102 may be associated with the execution of one or more lifecycle operations performed by one or more of the components included in the secured environment 160, including one or more application instances 162, one or more infrastructure components 164, and/or one or more networks 166, among others. In one example, the lifecycle operations system 102 may include or be associated with landscape management software that helps users reduce the total cost of ownership (TCO) of their system and improve business agility by simplifying and automating the efforts required to configure, provision, deploy, monitor, and manage their systems in both physical and virtualized infrastructures. One example of such a system may be SAP's Landscape Management, Enterprise Edition, among others. The lifecycle operations system 102 can manage the lifecycle of one or more components based on input or instructions from administrators, users, particular systems or applications, or based on any suitable instructions identified by or received at the lifecycle operations system 102. Any number of lifecycle operations may be available, with a few examples provided herein.

System copy: A system (e.g., comprising a number "n" of application instances, databases, networks, etc.) is completely copied (e.g., data, configuration, application code, etc.). The name and identifier of the system and service endpoints associated therewith may or may not be changed.

System refresh: Operational and customer data of a previously copied system is updated by the data of the original/source system.

System rename: A system's identifier, name, and/or its endpoints are renamed.

System creation: A system is created either by a manual installation or via the use of a predefined appliance deployed on a virtual machine manager/hypervisor.

In general, the lifecycle operations system 102 can manage these operations. In some instances, the lifecycle operations system 102 can receive requests from client 170 (e.g., via client application 176) or by the intrusion detection system 130 and provide responses or perform actions in response to those requests. As illustrated, the lifecycle operations system 102 includes an interface 104, a processor 106, a lifecycle operation manager 108, and memory 114.

Interface 104 is used by the system 102 for communicating with other systems in a distributed environment—including within the environment 100—connected to the lifecycle operations system 102 and/or network 120, e.g., client(s) 170, one or more components of the secured environment 160, or the intrusion detection system 130, as well as other systems or components communicably coupled to the network 120. Generally, the interface 104 comprises logic encoded in software and/or hardware in a suitable combination and operable to communicate with the network 120 and other communicably coupled components. More specifically, the interface 104 may comprise software supporting one or more communication protocols associated with communications such that the lifecycle operations system 102, network 120, and/or interface's hardware is operable to communicate physical signals within and outside of the illustrated environment 100.

Network 120 facilitates wireless or wireline communications between the components of the environment 100 (e.g., between the system 102 and the intrusion detection system 130 and/or client 170, among others) as well as with any other local or remote computer, such as additional mobile devices, clients, servers, remotely executed or located portions of a particular component, or other devices communicably coupled to network 120, including those not illustrated in FIG. 1. In the illustrated environment, the network 120 is depicted as a single network, but may be comprised of more than one network without departing from the scope of this disclosure, so long as at least a portion of the network 120 may facilitate communications between senders and recipients. In some instances, one or more of the illustrated components (e.g., the lifecycle operations system 102) may be included within network 120 as one or more cloud-based services or operations. The network 120 may be all or a portion of an enterprise or secured network, while in another instance, at least a portion of the network 120 may represent a connection to the Internet. In some instances, a portion of the network 120 may be a virtual private network (VPN). Further, all or a portion of the network 120 can comprise either a wireline or wireless link. Example wireless links may include 802.11a/b/g/n/ac, 802.20, WiMax, LTE, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the lifecycle operations system 102, in particular those related to executing the lifecycle operation manager 108. Specifically, the processors 106 execute the algorithms and operations described in the illustrated figures, as well as the various software modules and functionality, including the functionality for sending communications to and receiving transmissions from the intrusion detection system 130 and/or clients 170, as well as to other devices and systems. Each processor 106 may have a single core or multiple cores, with each core available to host and execute an individual processing thread. In some instances, a cloud-based solution may use one or more remotely or otherwise available processors 106 and their cores to allow for further operations and optimization of operations via parallel processing. As noted, the processor 106 executes the operations of and those associated with the lifecycle operations system 102, particularly in executing the lifecycle operation manager 108.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The lifecycle operation manager 108 (or "LOM" 108), may be any application, framework, agent, or other software capable of managing the lifecycle operations associated with one or more components included in the secured environment 160. In some instances, the LOM 108 may include one or more sub-modules, agents, or software for executing its operations, including a context generator 110 and a log generator 112. These components may be distinct subparts of the LOM 108, remotely executed agents or software, and/or functionality inherent to the LOM 108, as suitable for different implementations.

As noted, the LOM 108 manages the lifecycle operations of at least one component included within the secured environment 160. In some instances, the LOM 108 may also be a part of the secured environment 160, where the secured environment 160 is defined as a group of components monitored by the intrusion detection system 130, described below. The LOM 108 may be a dedicated component managing the lifecycle of a plurality of components by causing one or more lifecycle operations to be executed in association with those components. In some instances, the LOM 108 may cause the lifecycle operations to be performed based on a particular schedule for one or more components, including pools of components. In some instances, the LOM 108 may react to application and/or user input or requests for particular lifecycle operations to be performed.

As illustrated, the LOM 108 is associated with a context generator 110 and a log generator 112. The context generator 110 provides functionality for the lifecycle operation manager 108 to generate a lifecycle-based context 116 that includes information identifying relationships between particular components within the secured environment 160, information on the current state of the LOM 108 and its managed components, as well as particular instances created or in the process of a lifecycle operation.

FIG. 4 provides an example view 400 of a lifecycle-based context 116. Legend 405 identifies the entries as including information related to a Source Entity, a Source Entity Type, a Target Entity, a Target Entity Type, a Relation, and a Valid Since entry. For example, the first entry 410 indicates that component (i.e., application instance) ERQ of the type SAPSystem is a copy of component ERP, also of type SAPSystem, along with a Valid Since value. In instances where increased network traffic is associated with ERQ and ERP which may otherwise throw or trigger a warning, the contextual information of their relationship as a source and copy can be used to understand why such increased network traffic occurred at the time of the copy and to lower the severity or potential issue associated with the identified increase.

Entries 415 and 420 indicate first (in 415) that ERQ(dev) represents a clone of ERQ(original), such as to be used in a development system. To ensure that the data used in the development system is current, a refresh process is used to match the development data to the production data. Entry 420 indicates that ERQ(dev) is in a refresh process currently, which information can be used to identify why additional network traffic is seen while the refresh is ongoing.

As described previously and will be described below, the intrusion detection system 130 may be able to use the information from the lifecycle-based context 116 to further evaluate a potentially malicious action or a detected event using the lifecycle-related information. Such information can be made accessible to the intrusion detection system 130 at system 102, or may be sent to the intrusion detection system 130 or another remote location to allow for accessing and review in response to an identified issue.

The log generator 112 provides functionality for generating logs related to the operations performed by the LOM 108. As compared to the context 116, the log 118 expresses the activities of the LOM 108 based on the activities as requested by particular users and/or requesting systems. The logs can identify the particular components associated with the lifecycle operation, the activity performed, the start and end time of the operation, the user requesting or otherwise responsible for the operation, and the identified reason for the lifecycle operation to be performed. The reason may be provided by, for example, a user triggering the operation, based on a linked ticket in an IT ticketing system organizing work (e.g., including approvals, etc.), or from another application that automatically triggers the LOM 108 to perform the activity. The lifecycle log 118 can be interpreted by the intrusion detection system 130 using its intrusion rule sets 148, along with the information obtained from the various components themselves, to identify whether any particular malicious actions or threats are present.

FIG. 5 provides an example view 500 of a lifecycle-based log 118. Legend 505 indicates that the log 118 includes a Source Entity, a Target Entity, an Activity, a Start and End Time of the Activity, a User associated with the Activity, and a Reason for the Activity. For example, entry 510 indicates that a systemCopy activity is performed from entity ERP to entity ERQ as related to UserA, with a reason of "Test System needed for project X." Based on standard analysis by the intrusion detection system 130, this appears to be a valid entry. However, entry 515 appears to be a malicious activity for several reasons and that may cause an alert to issue and/or one or more countermeasures to be automatically deployed. First, the Target Entity name is "USR", where "USR" is a reserved system name in the current environment which no systems are allowed to use, as the name USR will create a directory on the file system and could be used as an attack (i.e., Linux systems have/usr directories). Still further, a Guest as indicated in entry 515 should not be allowed to trigger a copy action, and no reason for such activity is provided. In other instances, one or more of these issues may cause an indication of a potentially malicious activity to be generated. Where all issues have been identified, a more severe mitigation action may be appropriate.

Both the lifecycle-based context 116 and the lifecycle logs 118 can be stored locally in memory 114. Memory 114 may represent a single memory or multiple memories. The memory 114 may include any memory or database module and may take the form of volatile or non-volatile memory including, without limitation, magnetic media, optical media, random access memory (RAM), read-only memory (ROM), removable media, or any other suitable local or remote memory component. The memory 114 may store various objects or data (e.g., the context 116 and logs 118, among others), including financial data, user information, administrative settings, password information, caches, applications, backup data, repositories storing business and/ or dynamic information, and any other appropriate information associated with the LOM 108 and/or the lifecycle operations system 102, including any parameters, variables, algorithms, instructions, rules, constraints, or references thereto. Additionally, the memory 114 may store any other appropriate data, such as VPN applications, firmware logs and policies, firewall policies, a security or access log, print or other reporting files, as well as others. While illustrated in memory 114, one or both of the context 116 or the logs 118 may be sent to one or more remote locations within (or outside of) environment 100.

Intrusion detection system 130 is any system, server, or set of servers associated with monitoring one or more components within a secured environment (e.g., secured environment 160). In general, an intrusion detection system (IDS) is a software application that monitors a network or systems for malicious activity or policy violations. Any detected activity or violation can be reported to an administrator, can be logged as a potential issue, or can trigger one or more countermeasure actions. Collectively, the actions taken by the intrusion detection system 130 may be called mitigation actions. In some instances, the intrusion detection system 130 may include or be associated with a threat detection system specifically monitoring for one or more threats to the secured environment 160. Any suitable detection and prediction system may be used. In some cases, a pattern-based intrusion detection algorithm may be executed by an intrusion detection application 136 executed by the intrusion detection system 130.

As illustrated, the intrusion detection system 130 includes an interface 132, a processor 134, the intrusion detection application 136, and memory 146. Interface 132 and processor 134 may be similar to or different from interface 104 and processor 106, respectively. Similarly, memory 146 may be similar to or different than memory 114, and can include an intrusion rule set 148, a set of collected logs 154, and a set of mitigation action rules 156. The intrusion rule set 148 can include rules associated with determinations of whether one or more intrusions, threats, or other malicious activities are occurring or have occurred. In some instances, the intrusion rule set 148 may include a set of static rule patterns 150 which define particular patterns or indices of intrusions and attacks. These static rule patterns 150 can be defined by known attack vector and combinations of factors, particular patterns of network traffic as they relate to one or more components or component types, as well as any other suitable and predefined pattern or rule set. The dynamic rule patterns 152 may be associated with a history of interactions and monitored activity within the secured environment 160, such that deviations from such historical performance and other anomalies may trigger an indication of a potential attack. Through learning mechanisms over time, including reactions and next steps performed by administrators and security professionals, the system 130 may be able to update the dynamic rule patterns 152 based on such actions, e.g., through use of the machine learning module 142 associated with the intrusion detection application 136.

Referring to the intrusion detection application 136, the application 136 may be any application, framework, agent, or other software capable of monitoring the secured environment 160 and its application instances 162, networks 166, and infrastructure components 164, as well as the LOM 108, for potential attacks or intrusions based on the intrusion rule set 148. In some instances, once a potential malicious action is detected, the intrusion detection application 136 can trigger one or more mitigation actions in response.

In some instances, the intrusion detection application 136 may include one or more sub-modules, agents, or software for executing its operations, including a log collector 138, an intrusion analyzer 140, a machine learning module 142, and a mitigation action module 144. These components may be distinct subparts of the intrusion detection application 136, remotely executed agents or software, and/or functionality inherent to the intrusion detection application 136, as suitable for different implementations. Further, these and any other components described herein may be separated or combined in other implementations.

The log collector 138 can perform operations associated with accessing and/or obtaining log files associated with any systems monitored by the intrusion detection application 136, including any of the components in the secured environment 160 and/or the LOM 108, where appropriate. The log files are collected and can be stored with the collected logs 154 of memory 146, or they may be stored in another location. In some instances, the log files may not be collected at the intrusion detection system 130, but instead at least some of the log files may be accessed or stored remotely. In some instances, the log collector 138 may also collect and/or access the lifecycle-based context 116 and store the context 116 with or separate from the collected logs 154. The collected log files 154 may be text files, word processor documents, spreadsheets, database tables, XML documents, or any other suitable format.

The intrusion analyzer 140 can perform the analysis on the collected logs 154 based on the intrusion rule sets 148. In some instances, the type of analysis and rules applied may differ based on a particular component being considered, an event or time at which the analysis is performed, or based on other information. In some instances, the lifecycle-based context 116 may be initially considered and used to determine which particular set of log files from the collected logs 154 is to be considered, or can be used to determine a particular rule set or set of rules 148 to be used in the analysis. In response to the analysis, the intrusion analyzer 140 can return information about whether one or more potential malicious activities have occurred within the monitored components based on the intrusion rule sets 148 applied and the collected logs 154. The intrusion analyzer 140, after initially determining that a potential malicious activity has occurred, can analyze the lifecycle-based context 116 to determine whether one or more of the identified potentially malicious activities is connected to or associated with a lifecycle operation that explains the actions or reasons for the particular activities occurring. In situations where a valid reason associated with the potentially malicious activity is found, the intrusion analyzer 140 may modify its determination of the activity. In some instances, the determination of the potentially malicious activity can be removed, while in other instances, the potential threat level of the issue may be reduced and/or the corresponding mitigation action changed or reduced (e.g., from launch automatic countermeasures to notify administrator of activity and reason for reduced or lowered threat level).

In some instances, the intrusion analyzer 140 may use the lifecycle-based context 116 and its entries as one attribute for the identification of a potentially malicious action during the intrusion analysis 140. For example, a lifecycle operation may include a system copy process with activated data scrambling. In such cases, the data is first copied, the target system is renamed, and the original (productive) data is scrambled for data privacy reasons. This is often done in test systems to allow real but protected data in testing. If within and/or during this lifecycle operation a relatively large amount of data is copied from the new system prior to scrambling, an assumption or determination of a potential attack can be made that the attacker is attempting to copy data before the scrambling is started. In such an instance, the information from the lifecycle-based context 116 may be used as part of the determination that a potentially malicious action has occurred.

Additionally, in some instances the intrusion analyzer 140 may use the lifecycle-based context 116 to identify or prioritize particular logs and/or log entries associated with one or more of the components in the secured environment. For example, a lifecycle operation may cause a system to be copied. The intrusion detection system 130 may, in its normal operations, raise an alert or other indication of potentially malicious activity due to the higher than expected traffic between the source and target components. If the context 116 is considered prior to the intrusion analysis, however, the intrusion analyzer 140 may delete or ignore probes, data, and other information in the logs containing information about the relatively high traffic as the reason for that traffic is known. Thus, the intrusion detection system 130 will not raise alerts that need to be suppressed later, as the alerts are not raised as the information that would trigger the alerts is not considered in the intrusion analysis.

The machine learning module 142 may interact with the intrusion analyzer 140 and the interactions with one or more administrators or other users to identify which rules from the intrusion rule set 148 are to be updated based on feedback from the users, actions taken in response to the indication of potentially malicious activity, and other information and actions performed in connection with identified issues. Further, the machine learning module 142 can be used to monitor network and internal operations over time, thereby creating a baseline knowledge of the standard actions and operations of the secured environment 160. Based on the known actions and operations, the machine learning module 142 can be used to update the dynamic rule patterns 152 and leverage the knowledge to identify deviations from the normal procedures and operations as potentially malicious activities. Other fuzzy learning and neural network-based operations and updates to the rules sets 148 may be performed, including tweaking and modification of the otherwise static rule patterns 150, where appropriate.

The mitigation action module 144 can, based on the identified intrusion detection by the intrusion analyzer 140, perform one or more suitable corresponding mitigation actions. The mitigation actions may include notifying a particular user or system of the identified potentially malicious activity, recommending an action to be taken, and/or automatically causing one or more countermeasures to be executed in response to the activity. Any suitable responsive mitigation action may be triggered that corresponds to the at least one identified malicious action. The mitigation action module 144 may take action automatically and without user input, thereby moving immediately to stem potential threats and intrusions to the secured environment 160. In some instances, the mitigation action module 144 can perform the review of the lifecycle-based context 116 prior to performing a particular mitigation action. Should a particular lifecycle operation be linked to the identified potentially malicious activity, the mitigation action module 144 can suppress the one or more mitigation actions planned to be triggered, or alternatively, the mitigation action module 144 can modify the particular one or more mitigations planned to be triggered and cause a mitigation action to be triggered that has a relatively lower risk level or severity than the original mitigation action identified by the mitigation action module 144.

As illustrated, one or more clients 170 may be present in the example system 100. Each client 170 may be associated with one or more client applications 176. The client applications 176 may provide access or insight to either of the intrusion detection system 130 and/or the lifecycle operations system 102, as well as the secured environment 160 or its components in some instances. As illustrated, the client 170 may include an interface 172 for communication (similar to or different from interfaces 104, 132), a processor 174 (similar to or different from processors 106, 134), the client application 176, memory 180 (similar to or different from memory 114, 146), and a graphical user interface (GUI) 178.

The illustrated client 170 is intended to encompass any computing device such as a desktop computer, laptop/notebook computer, mobile device, smartphone, personal data assistant (PDA), tablet computing device, one or more processors within these devices, a virtual client associated with a cloud-based network or process, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with the client application 176, and an output device that conveys information associated with the operation of the applications and their application windows to the user of the client 170. Such information may include digital data, visual information, or a GUI 178, as shown with respect to the client 170. Specifically, the client 170 may be any computing device operable to communicate with any of the other systems in environment 100, including one or more of the intrusion detection system 130, the lifecycle operations system 102, one or more of the components of the secured environment 160, and/or other components via network 120, as well as with the network 120 itself, using a wireline or wireless connection. In general, client 170 comprises an electronic computer device operable to receive, transmit, process, and store any appropriate data associated with the environment 100 of FIG. 1.

GUI 178 of the client 170 interfaces with at least a portion of the environment 100 for any suitable purpose, including generating a visual representation of the client application 176, which in turn can present at least a portion of information associated with one or more of the other systems. In particular, the GUI 178 may be used to present results or feedback from the intrusion detection system 130, as well as information about the lifecycle operations managed by the LOM 108. GUI 178 may also be used to view and interact with various Web pages, applications, and Web services located local or external to the client 170. Generally, the GUI 178 provides the user with an efficient and user-friendly presentation of data provided by or communicated within the system. The GUI 178 may comprise a plurality of customizable frames or views having interactive fields, pull-down lists, and buttons operated by the user. For example, the GUI 178 may provide interactive elements that allow a user to view or interact with information related to the operations of processes associated with the various systems 102, 130, among others. In general, the GUI 178 is often configurable, supports a combination of tables and graphs (bar, line, pie, status dials, etc.), and is able to build real-time portals, application windows, and presentations. Therefore, the GUI 178 contemplates any suitable graphical user interface, such as a combination of a generic web browser, a web-enabled application, intelligent engine, and command line interface (CLI) that processes information in the platform and efficiently presents the results to the user visually.

In general, client application 176 may be any application capable of interacting with one or more of the described components, including the intrusion detection application 136 or the LOM 108. In some instances, different clients 170 and client applications 176 may have access to one, both, or neither of the different systems, including through different authorizations and authentications. In the illustrated example, client application 176 may be a web browser, mobile application, cloud-based application, or dedicated remote application or software capable of interacting with at least some of the illustrated systems via network 120 to request and subsequently present results of such interaction. Different clients 170 may be associated with different roles, where information about particular incidents and detected potential attacks are selectively provided to the client applications 176 corresponding to the users or administrators associated with the components at which the incidents occur or are otherwise associated. In other instances, a single client 170 could serve multiple or both use cases. For example, a client may have a UI combining data from lifecycle operations system 102 and intrusion detection system 130, as well as possibly the secured environment 160, within one view or related views.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
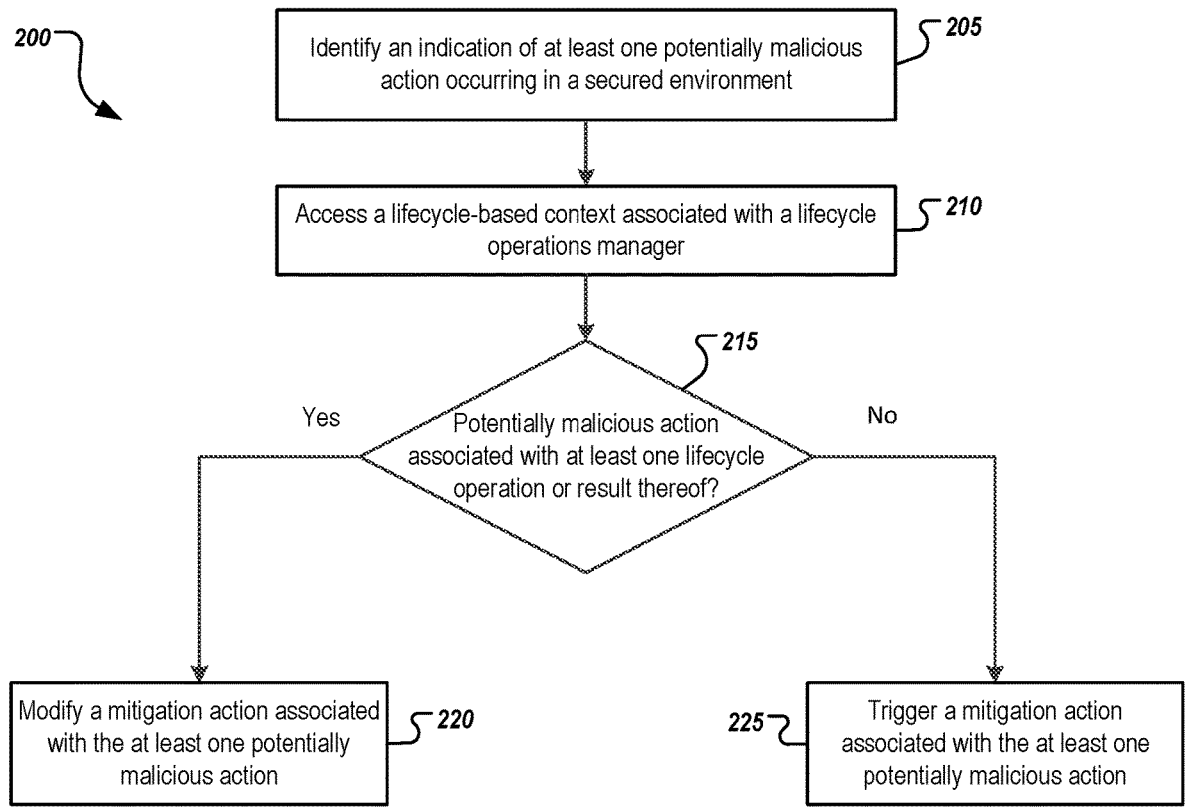
FIG. 2 is an example flowchart of a process for automatically incorporating contextual lifecycle information for a secured environment into an intrusion and/or threat detection system's monitoring operations.

FIG. 2 is an example flowchart of a process 200 for automatically incorporating lifecycle context information for a secured environment into an intrusion and/or thread detection systems monitoring operations. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate. In some instances, method 200 may be performed at or by an intrusion detection system, such as intrusion detection system 130 of FIG. 1.

At 205, an indication of at least one potentially malicious action occurring in a secured environment monitored by an intrusion detection system can be identified. The indication of the at least one potentially malicious action may be based on an analysis of log files associated with one or more of the components included in the secure environment. Those components may include one or more application instances, one or more infrastructure components (e.g., networks, storage, honeypots, firewalls, etc.), complex systems combining two or more application instances and/or infrastructure components, as well as other suitable components or systems. The secured environment may be defined by the particular components monitored by the intrusion detection system. In some instances, the intrusion detection system may use one or more malicious action rule sets to identify when particular actions and activities identified in the collected logs of the components of the secured environment correspond to potentially malicious activities. In some instances, the malicious action rule sets may be based on or associated with one or more patterns to be identified from the logs themselves, including combinations of activity and values from the logs of different components.

At 210, a lifecycle-based context associated with a lifecycle operations manager can be accessed, where the lifecycle operations manager is responsible for managing the lifecycle operations associated with at least one component included in the secured environment. The lifecycle-based context can include or store contextual information associated with at least one of the lifecycle operations executed by the lifecycle operations manager. The context can be used to provide further information, explanation, and intelligence to determinations of whether particular activities initially determined to be malicious are in actuality tied to a particular lifecycle operation. In some instances, the information included in the context may provide resulting states of the one or more components within the secured environment after or as a result of at least one lifecycle operation executed by the lifecycle operation manager.

At 215, a determination is made as to whether the at least one identified potentially malicious action or activity is associated with at least one lifecycle operation or a result associated with lifecycle operation being executed or performed. If a match or relationship to a particular lifecycle operation is found, then method 200 continues at 220, where a particular mitigation action associated with the at least one potentially malicious action is modified. The modification can include full suppression of the mitigation action, a reduction of the relative severity of modification actions as compared to the original mitigation action, or a substitution of an alternative mitigation action for the original mitigation action. If a modified mitigation action is determined other than full suppression, upon modification the new modified mitigation action can be triggered or otherwise executed at or after 220. If not, method 200 continues at 225, where the mitigation action associated with the identified at least one potentially malicious action is triggered. The mitigation action may include notifying a particular user or administrator of the at least one potentially malicious action, automatically and without user input initiating the triggering of one or more automatic security countermeasures by the intrusion detection system or another related system, or any other suitable mitigation action. In some instances, instead of modifying the mitigation action as described here, the related lifecycle operation may be another parameter used to identify a correct or proper mitigation action to be performed as opposed to adjusting the priority associated with the modified mitigation action. For example, the potentially malicious action, when combined with the associated lifecycle operation, may be used as parameters to identify an additional or alternative mitigation action, such as a particular countermeasure or other responsive activity. In some instances, context data may be used to assist in initially identifying a potentially malicious action (e.g., based on the data itself, based on the context data in light of or in combination with particular actions identified within a secured environment-related log, etc.). Additionally, the context data may be used to pre-filter the logs used to identify the at least one potentially malicious action prior to performing the determination of whether a potentially malicious action exists in the logs themselves. This is, data not associated with particular entries in the context data may be ignored or removed from the logs when attempting to identify and detect a potentially malicious action.

Figure 3:
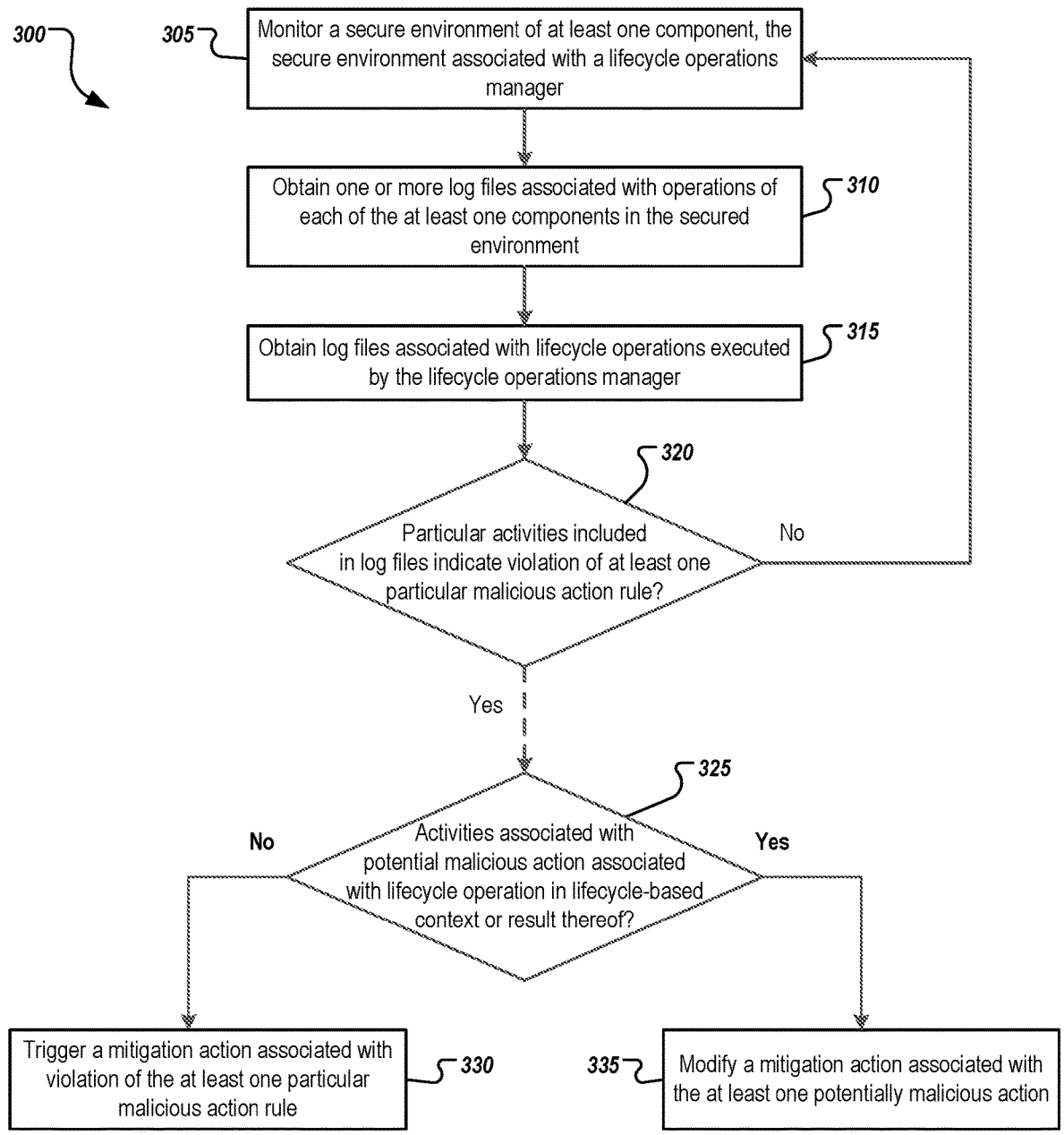
FIG. 3 is an example flowchart of a process for automatically incorporating lifecycle log information for a lifecycle operation manager associated with a secured environment into an intrusion and/or threat detection system's monitoring operations.

FIG. 3 is an example flowchart of a process 300 for automatically incorporating lifecycle log information for a lifecycle operation manager associated with a secured environment into an intrusion and/or thread detection systems monitoring operations. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 may be performed at or by an intrusion detection system, such as intrusion detection system 130 of FIG. 1.

At 305, a secure environment comprises at least one component that is monitored by an intrusion detection system. In the current implementation, the secured environment, or at least one of the components included in the secured environment, is associated with a lifecycle operations manager responsible for, among other things, executing, managing, and logging the lifecycle operations of the associated components.

At 310, one or more log files associated with operations of each of the at least one components in the secured environment are obtained. The log files may be provided directly to the intrusion detection system, or the intrusion detection system may access the log files at the particular components or at a storage location associated with the components where those log files are stored. The log files can be used to identify potential malicious activity based on one or more malicious action rules applied by the intrusion detection system. At 315, one or more log files associated with the lifecycle operations executed by the lifecycle operations manager are obtained, such that the lifecycle operation information can be considered along with the component-related log files.

At 320, a determination is made as to whether particular activities included in the obtained log files indicate a violation of at least one particular malicious action rule. The malicious action rules may be static or dynamic rule sets based on predefined rules or patterns, or based upon anomaly-related evaluations as compared to a normal network and secured environment traffic and activity. The dynamic rule sets may also be updated over time in response to a machine learning or neural network-related learning system, as well as from feedback and responsive actions taken by administrators in response to previous intrusion and threat detections triggered by the system. If no violations are detected, then method 300 can return to 305 and continue its monitoring operations. If, however, at least one potential violation is detected, method 300 may continue to either 325 or 330. In some instances, in addition to an evaluation of the log files, method 300 may include a determination similar to 215 of FIG. 2, that is, to determine if the potentially malicious action is associated with an otherwise explainable lifecycle operation or result thereof. In some cases, whether 325 is triggered may depend on the type of potentially malicious action detected at 320 from the log files, or other particularities of the determination and/or log files. However, where the further consideration of 325 is performed, the lifecycle-based context generated by the lifecycle operations manager can be considered. If no connection is made, method 300 can continue to 330, where a mitigation action associated with the violation of the at least one particular malicious action rule is triggered. If a connection is made, method 300 continues to 335 where a mitigation action originally associated with the violation and the type of malicious activity can be modified based on the connection to at least one lifecycle operation or result thereof indicated in the lifecycle-based context. If a modified mitigation action is determined other than full suppression, upon modification the new modified mitigation action can be triggered or otherwise executed at or after 335. Returning to 320, if determination 325 is not present or not applicable to the current violation, then method 300 can proceed directly from determination 320 to operation 330.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method performed by one or more processors, the method comprising:
   monitoring, by an intrusion detection system, a secured environment comprising at least one component, the secured environment associated with a lifecycle operations manager responsible for managing lifecycle operations associated with the at least one component in the secured environment;
   obtaining, by the intrusion detection system, one or more log files associated with operations of each of the at least one component;
   obtaining, by the intrusion detection system, log files associated with lifecycle operations executed by the lifecycle operations manager on at least one respective component of the at least one component in the secured environment;
   accessing, by the intrusion detection system, a lifecycle-based context associated with the lifecycle operations manager, wherein the lifecycle-based context stores contextual information associated with the lifecycle operations, wherein the lifecycle operations are executed by the lifecycle operations manager on the at least one respective component of the at least one component in the secured environment;
   pre-filtering, by the intrusion detection system and based on the contextual information stored in the lifecycle based context, the log files to identify at least one potentially malicious action prior to determining whether a malicious action exists in the log files, wherein pre-filtering includes removing data from the log files that is not associated with particular entries in the lifecycle-based context;
   determining, by the intrusion detection system and based on the pre-filtered log files, whether a violation of at least one particular malicious action rule from a malicious action rules set is associated with one or more of the lifecycle operations associated with the lifecycle-based context; and
   in response to determining that the violation of the at least one particular malicious action rule is associated with the one or more of the lifecycle operations associated with the lifecycle-based context:
      identifying a particular mitigation action associated with the violation of the at least one particular malicious action rule, wherein the particular mitigation action includes one or more countermeasure actions that are to be taken by the intrusion detection system in response to the violation, and
      performing the particular mitigation action by the intrusion detection system.

2. The method of claim 1, wherein the intrusion detection system comprises a threat detection system.

3. The method of claim 1, wherein obtaining the log files associated with the lifecycle operations executed by the lifecycle operations manager comprises receiving, at the intrusion detection system, a forwarded copy of activity logs generated by the operations of the lifecycle operations manager.

4. The method of claim 1, wherein the lifecycle operations manager executes remotely from the secured environment.

5. The method of claim 1, wherein the particular mitigation action includes at least one of presenting a warning to a responsible entity and automatic triggering of at least one electronic countermeasure corresponding to the violation of the at least one particular malicious action rule.

6. The method of claim 1, wherein the malicious action rule set is evaluated by the intrusion detection system, wherein each malicious action rule defines at least one pattern defining a potential malicious action associated with one or more monitored activities occurring in association with the secured environment.

7. The method of claim 1, wherein the secured environment includes at least one of one or more independent application instances, systems comprising several related application instances, and an infrastructure environment, the infrastructure environment comprising at least one of one or more storage instances, one or more networks, one or more honeypots, and one or more firewalls.

8. The method of claim 1, wherein the lifecycle-based context includes information identifying relationships between:
  i) components from the at least one component, wherein the at least one component includes a plurality of components in the secured environment;
  ii) information of a current state of the lifecycle operations manager and the at least one component managed by the lifecycle operations manager; and
  iii) particular instances created in a process of a lifecycle operation from the lifecycle operations.

9. An intrusion detection system comprising:
at least one processor; and
a memory communicatively coupled to the at least one processor, the memory storing instructions which, when executed, cause the at least one processor to perform operations comprising:
  monitoring, by the intrusion detection system, a secured environment comprising at least one component, the secured environment associated with a lifecycle operations manager responsible for managing lifecycle operations associated with the at least one component in the secured environment;
  obtaining, by the intrusion detection system, one or more log files associated with operations of each of the at least one component;
  obtaining, by the intrusion detection system, log files associated with lifecycle operations executed by the lifecycle operations manager on at least one respective component of the at least one component in the secured environment;
  accessing, by the intrusion detection system, a lifecycle-based context associated with the lifecycle operations manager, wherein the lifecycle-based context stores contextual information associated with the lifecycle operations, wherein the lifecycle operations are executed by the lifecycle operations manager on the at least one respective component of the at least one component in the secured environment;
  pre-filtering, by the intrusion detection system and based on the contextual information stored in the lifecycle based context, the log files to identify at least one potentially malicious action prior to determining whether a malicious action exists in the log files, wherein pre-filtering includes removing data from the log files that is not associated with particular entries in the lifecycle-based context;
  determining, by the intrusion detection system and based on the pre-filtered log files, whether a violation of at least one particular malicious action rule from a malicious action rules set is associated with one or more of the lifecycle operations associated with the lifecycle-based context; and
  in response to determining that the violation of the at least one particular malicious action rule is associated with the one or more of the lifecycle operations associated with the lifecycle-based context:
    identifying a particular mitigation action associated with the violation of the at least one particular malicious action rule, wherein the particular mitigation action includes one or more countermeasure actions that are to be taken by the intrusion detection system in response to the violation, and performing the particular mitigation action by the intrusion detection system.

10. The system of claim 9, wherein the intrusion detection system comprises a threat detection system.

11. The system of claim 9, wherein obtaining the log files associated with the lifecycle operations executed by the lifecycle operations manager comprises receiving, at the intrusion detection system, a forwarded copy of activity logs generated by the operations of the lifecycle operations manager.

12. The system of claim 9, wherein the particular mitigation action includes at least one of presenting a warning to a responsible entity and automatic triggering of at least one electronic countermeasure corresponding to the violation of the at least one particular malicious action rule.

13. The system of claim 9, wherein the malicious action rule set is evaluated by the intrusion detection system, wherein each malicious action rule defines at least one pattern defining a potential malicious action associated with one or more monitored activities occurring in association with the secured environment.

14. The system of claim 9, wherein the lifecycle-based context includes information identifying relationships between:
  i) components from the at least one component, wherein the at least one component includes a plurality of components in the secured environment;
  ii) information of a current state of the lifecycle operations manager and the at least one component managed by the lifecycle operations manager; and
  iii) particular instances created in a process of a lifecycle operation from the lifecycle operations.

15. A non-transitory computer-readable medium storing instructions which, when executed, cause at least one processor to perform operations comprising:
  monitoring, by an intrusion detection system, a secured environment comprising at least one component, the secured environment associated with a lifecycle operations manager responsible for managing lifecycle operations associated with the at least one component in the secured environment;
  obtaining, by the intrusion detection system, one or more log files associated with operations of each of the at least one component;
  obtaining, by the intrusion detection system, log files associated with lifecycle operations executed by the lifecycle operations manager on at least one respective component of the at least one component in the secured environment;
  accessing, by the intrusion detection system, a lifecycle-based context associated with the lifecycle operations manager, wherein the lifecycle-based context stores contextual information associated with the lifecycle operations, wherein the lifecycle operations are executed by the lifecycle operations manager on the at least one respective component of the at least one component in the secured environment;
  pre-filtering, by the intrusion detection system and based on the contextual information stored in the lifecycle based context, the log files to identify at least one potentially malicious action prior to determining whether a malicious action exists in the log files, wherein pre-filtering includes removing data from the log files that is not associated with particular entries in the lifecycle-based context;
  determining, by the intrusion detection system and based on the pre-filtered log files, whether a violation of at least one particular malicious action rule from a malicious action rules set is associated with one or more of the lifecycle operations associated with the lifecycle-based context; and in response to determining that the violation of the at least one particular malicious action rule is associated with the one or more of the lifecycle operations associated with the lifecycle-based context:

identifying a particular mitigation action associated with the violation of the at least one particular malicious action rule, wherein the particular mitigation action includes one or more countermeasure actions that are to be taken by the intrusion detection system in response to the violation, and performing the particular mitigation action by the intrusion detection system.

16. The computer-readable medium of claim 15, wherein obtaining the log files associated with the lifecycle operations executed by the lifecycle operations manager comprises receiving, at the intrusion detection system, a forwarded copy of activity logs generated by the operations of the lifecycle operations manager.

17. The computer-readable medium of claim 15, wherein the particular mitigation action includes at least one of presenting a warning to a responsible entity and automatic triggering of at least one electronic countermeasure corresponding to the violation of the at least one particular malicious action rule, and wherein the malicious action rule set is evaluated by the intrusion detection system, wherein each malicious action rule defines at least one pattern defining a potential malicious action associated with one or more monitored activities occurring in association with the secured environment.

18. The computer-readable medium of claim 15, wherein the lifecycle-based context includes information identifying relationships between:

i) components from the at least one component, wherein the at least one component includes a plurality of components in the secured environment;

ii) information of a current state of the lifecycle operations manager and the at least one component managed by the lifecycle operations manager; and iii) particular instances created in a process of a lifecycle operation from the lifecycle operations.

* * * * *